(12) United States Patent
Puerto et al.

(10) Patent No.: US 9,311,546 B2
(45) Date of Patent: Apr. 12, 2016

(54) BIOMETRIC IDENTITY VERIFICATION FOR ACCESS CONTROL USING A TRAINED STATISTICAL CLASSIFIER

(75) Inventors: Sergio Grau Puerto, Oxford (GB); Tony John Allen, Nottingham (GB)

(73) Assignee: Nottingham Trent University, Nottingham (GB)

( * ) Notice: Subject to any disclaimer, the term of this patent is extended or adjusted under 35 U.S.C. 154(b) by 422 days.

(21) Appl. No.: 13/130,798

(22) PCT Filed: Nov. 27, 2009

(86) PCT No.: PCT/GB2009/002769
§ 371 (c)(1), (2), (4) Date: Aug. 11, 2011

(87) PCT Pub. No.: WO2010/061194
PCT Pub. Date: Jun. 3, 2010

(65) Prior Publication Data
US 2011/0285504 A1    Nov. 24, 2011

(30) Foreign Application Priority Data
Nov. 28, 2008  (GB) .................................. 0821766.3

(51) Int. Cl.
*G08B 29/00* (2006.01)
*G06F 15/18* (2006.01)
(Continued)

(52) U.S. Cl.
CPC ............ *G06K 9/00973* (2013.01); *G10L 17/18* (2013.01)

(58) Field of Classification Search
CPC ............................ G06K 9/00973; G10L 17/18
USPC ............................ 340/5.82–5.84, 5.52, 5.53; 382/115–127, 155–161; 704/273, 274, 704/276, E17.001; 705/3, 26.1, 44; 706/15, 706/18, 20, 25; 707/999.006; 713/186; 726/2, 3, 16, 19, 21, 27
See application file for complete search history.

(56) References Cited

U.S. PATENT DOCUMENTS 5,023,901 A * 6/1991 Sloan ..................... H04M 11/04
                                                        340/505
5,053,608 A * 10/1991 Senanayake .................. 235/380
(Continued)

FOREIGN PATENT DOCUMENTS

EP    1096474 A2    5/2001
EP    1531459 A1    5/2005
(Continued)

OTHER PUBLICATIONS

Mak et al.; Speaker identification using multilayer perceptrons and radial basis function networks; Elsevier; vol. 6; No. 1; pp. 99-117; Feb. 1994.
(Continued)

*Primary Examiner* — Fekadeselassie Girma
*Assistant Examiner* — Stephen Burgdorf
(74) *Attorney, Agent, or Firm* — Shay Glenn LLP

(57) ABSTRACT

A method and apparatus for providing biometric authentication of a user uses a registration process in which a reference data sample representative of a biometric attribute of a reference user is used to train a statistical classifier such as a neural network to achieve a target output. The set of parameters of the statistical classifier, e.g. the weights that achieve this in the neural network, are stored on a user's device as a first data set. For subsequent authentication of a user to be tested at an access point, the first data set is retrieved from the user device and a second data set representative of the biometric attribute of the test user is generated directly from the test user. The first data set is used as a set of parameters in a statistical classifier, e.g. as weights in an artificial neural network, to generate a trained classifier or neural network and the second data set is then used as input to the trained classifier or neural network. The output of the trained classifier or neural network is then used to determine a degree of correlation between the biometric attribute of the reference user and the biometric attribute of the test user to be authenticated.

19 Claims, 3 Drawing Sheets

Figure 1:
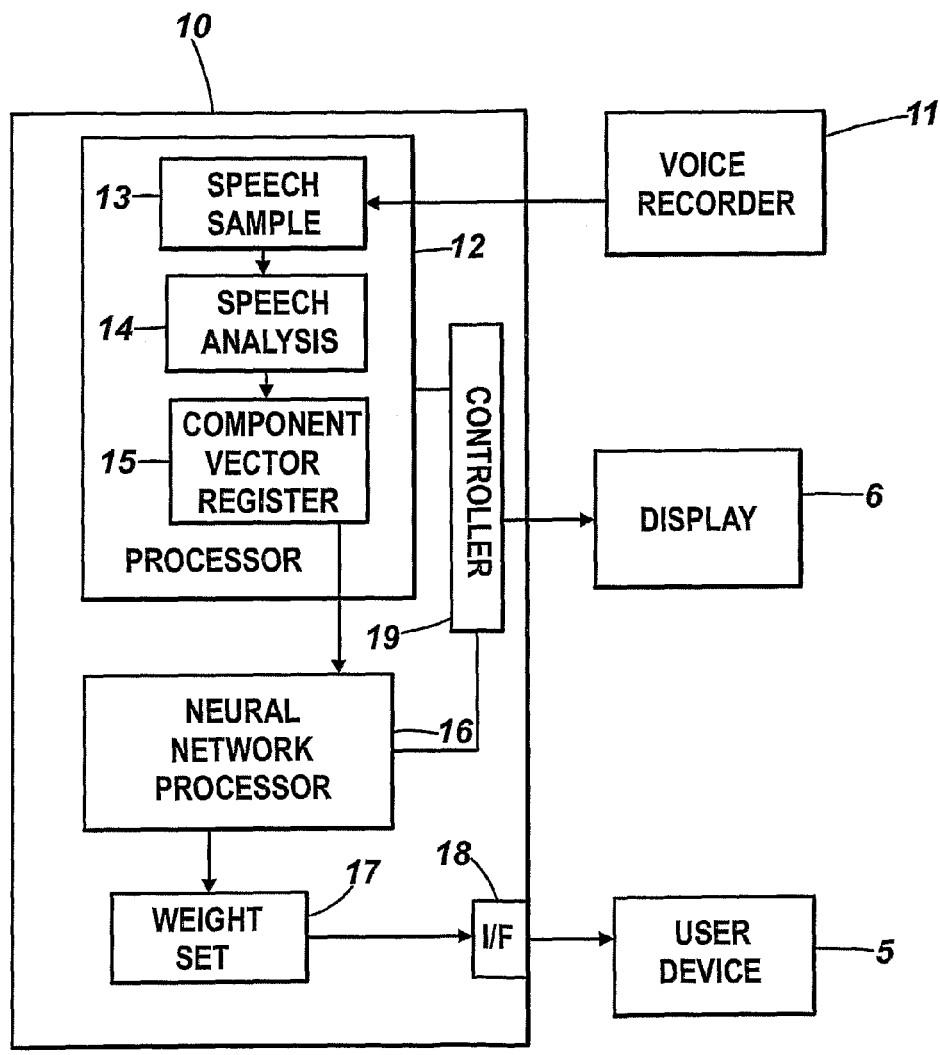

(51) Int. Cl.
*G06N 3/08* (2006.01)
*G06K 9/00* (2006.01)
*G10L 17/18* (2013.01)

(56) References Cited

U.S. PATENT DOCUMENTS

| | | | |
|---|---|---|---|
| 5,481,265 A | | 1/1996 | Russell |
| 5,583,961 A | * | 12/1996 | Pawlewski et al. ..... G10L 25/87 704/205 |
| 5,583,968 A | * | 12/1996 | Trompf .......................... 704/232 |
| 5,687,287 A | | 11/1997 | Gandhi et al. |
| 5,699,449 A | * | 12/1997 | Javidi ............................. 382/156 |
| 5,729,220 A | | 3/1998 | Russell |
| 5,806,040 A | * | 9/1998 | Vensko .............. G06Q 20/4014 704/233 |
| 6,128,398 A | * | 10/2000 | Kuperstein et al. ........... 382/118 |
| 6,201,484 B1 | | 3/2001 | Russell |
| 6,411,930 B1 | | 6/2002 | Burges |
| 6,441,770 B2 | | 8/2002 | Russell |
| 6,519,561 B1 | * | 2/2003 | Farrell et al. .................. 704/232 |
| D511,113 S | | 11/2005 | Feldman et al. |
| D511,114 S | | 11/2005 | Feldman et al. |
| 7,386,448 B1 | | 6/2008 | Poss et al. |
| 7,627,475 B2 | * | 12/2009 | Petrushin ................. G10L 17/26 704/231 |
| 2001/0056349 A1 | * | 12/2001 | St. John ............. G07C 9/00158 704/270 |
| 2004/0151347 A1 | * | 8/2004 | Wisniewski ................... 382/115 |
| 2005/0038647 A1 | * | 2/2005 | Baker ................... G10L 15/065 704/231 |
| 2005/0129189 A1 | | 6/2005 | Creamer et al. |
| 2005/0138394 A1 | | 6/2005 | Poinsenet et al. |
| 2005/0188213 A1 | * | 8/2005 | Xu ................................. 713/186 |
| 2005/0281439 A1 | | 12/2005 | Lange |
| 2005/0286761 A1 | * | 12/2005 | Xu ................................. 382/159 |
| 2006/0013445 A1 | | 1/2006 | Lange |
| 2006/0136744 A1 | | 6/2006 | Lange |
| 2006/0224899 A1 | | 10/2006 | Haala |
| 2007/0255564 A1 | * | 11/2007 | Yee .......................... G10L 17/24 704/246 |
| 2008/0104415 A1 | * | 5/2008 | Palti-Wasserman et al. . 713/186 |
| 2009/0287489 A1 | * | 11/2009 | Savant .................... G10L 15/07 704/246 |

FOREIGN PATENT DOCUMENTS

| | | |
|---|---|---|
| EP | 1915294 A2 | 4/2008 |
| FR | 2817425 A1 | 5/2002 |
| FR | 2864289 A1 | 6/2005 |
| NZ | 539208 A | 10/2007 |
| WO | WO 99/23643 A1 | 5/1999 |
| WO | WO 01/27723 A1 | 4/2001 |
| WO | WO 02/29785 A1 | 4/2002 |
| WO | WO 03/038557 A2 | 5/2003 |
| WO | WO 2004/012388 A1 | 2/2004 |
| WO | WO 2004/100083 A1 | 11/2004 |
| WO | WO 2004/112001 A1 | 12/2004 |
| WO | WO 2005/055200 A1 | 6/2005 |
| WO | WO 2005/122462 A1 | 12/2005 |
| WO | WO 2006/014205 A2 | 2/2006 |
| WO | WO 2006/048701 A2 | 5/2006 |
| WO | WO 2006/059190 A2 | 6/2006 |
| WO | WO 2006/061833 A2 | 6/2006 |
| WO | WO 2007/060360 A1 | 5/2007 |
| WO | WO 2007/079359 A2 | 7/2007 |
| WO | WO 2009/124562 A1 | 10/2009 |
| WO | WO 2010/047816 A1 | 4/2010 |

OTHER PUBLICATIONS

Farrell et al.; Speaker recognition using neural networks and conventional classifiers; IEEE trans.; vol. 2; No. 1; pp. 194-205; Jan. 1994.

Jain et al.; Handbook of Biometrics; Springer, New York; Chapter 8; Chapter 19; Aug. 2008.

* cited by examiner

BIOMETRIC IDENTITY VERIFICATION FOR ACCESS CONTROL USING A TRAINED STATISTICAL CLASSIFIER

The present invention relates to methods and apparatus for providing secure biometric authentication of individuals attempting to gain access to an electronically controlled resource. The resource to which the individuals are attempting to gain access could be, for example, a computer system. The expression "gain access to" is intended to encompass actions such as: authenticating a transaction on a network, such as a financial transaction or a login transaction; authorising or initiating a transaction or other event on a computer system or network; and physically accessing a building or other restricted area.

There are numerous systems in the prior art which provide biometric authentication of an individual. These systems generally require that a user is first registered or enrolled by providing their biometric identification information to a central or remote database resource. Corresponding biometric information is subsequently gathered in real time from a user at a point of access, such as an immigration desk, a building entry system or a computer login facility. The central database of biometric information is generally remote from the points of access. Before a user is allowed access to the resource, the biometric information gathered at the point of access in real time is compared with the central or remote database and a decision is then made whether the user presenting at the point of access corresponds with a registered user.

There are a number of potential disadvantages with such a system.

The implementation of a central database requires real time communication with that database for every point of access, in order to authenticate users presenting themselves at the points of access. If there are many points of access, this necessitates an extensive communication infrastructure. The implementation of a central database also requires that users are happy to have their biometric information stored remotely by a third party, which may not always be the case. The use of a remote database also means that the user's biometric information must be transmitted over the communication infrastructure for every authentication event so that comparison can take place, either at the point of access or at the central database. In other words, for the comparison between a registered user's biometric information and that gathered in real time for a user under test, either the centrally held registration record must be transferred to the point of access, or the real time gathered information from the point of access must be transferred to the central database. In either case, transferring such information over communication networks, and in particular over long distance communication networks, provides an additional security risk and/or an encryption and decryption overhead. Finally, centrally stored biometric data can only be accessed from the service provider with whom the user enrolled. Users must therefore provide their biometric profiles separately to every service provider who wishes to use such biometric identity verification to validate user access.

It is an object of the present invention to overcome or mitigate some or all of these problems.

According to one aspect of the present invention, there is provided a method of biometric authentication of a user, comprising the steps of:

storing, in a first device, a first data set derived from a biometric attribute of a reference user;

obtaining, by a second device, a second data set representative of the biometric attribute of a test user to be authenticated;

using the first data set as a set of parameters of a statistical classifier to generate a trained statistical classifier;

providing the second data set as input to the trained classifier; and determining, from the trained classifier output corresponding to said input, a degree of correlation between the biometric attribute of the reference user and the biometric attribute of the test user to be authenticated.

According to another aspect of the present invention, there is provided an apparatus for providing biometric authentication of a user, comprising:

first input means for receiving a first data set derived from a biometric attribute of a reference user;

second input means for receiving a second data set representative of the biometric attribute of a test user to be authenticated;

a processor configured as a statistical classifier, the processor adapted to receive the first data set and program the statistical classifier with said first data set as a set of parameters in the classifier to generate a trained classifier;

the processor being further adapted to receive the second data set as input to the trained classifier; and means for determining, from the trained classifier output corresponding to said input, a degree of correlation between the biometric attribute of the reference user and the biometric attribute of the test user to be authenticated.

In a preferred embodiment the statistical classifier is an artificial neural network and the parameters of the statistical classifier correspond to weights in the artificial neural network.

Figure 2:
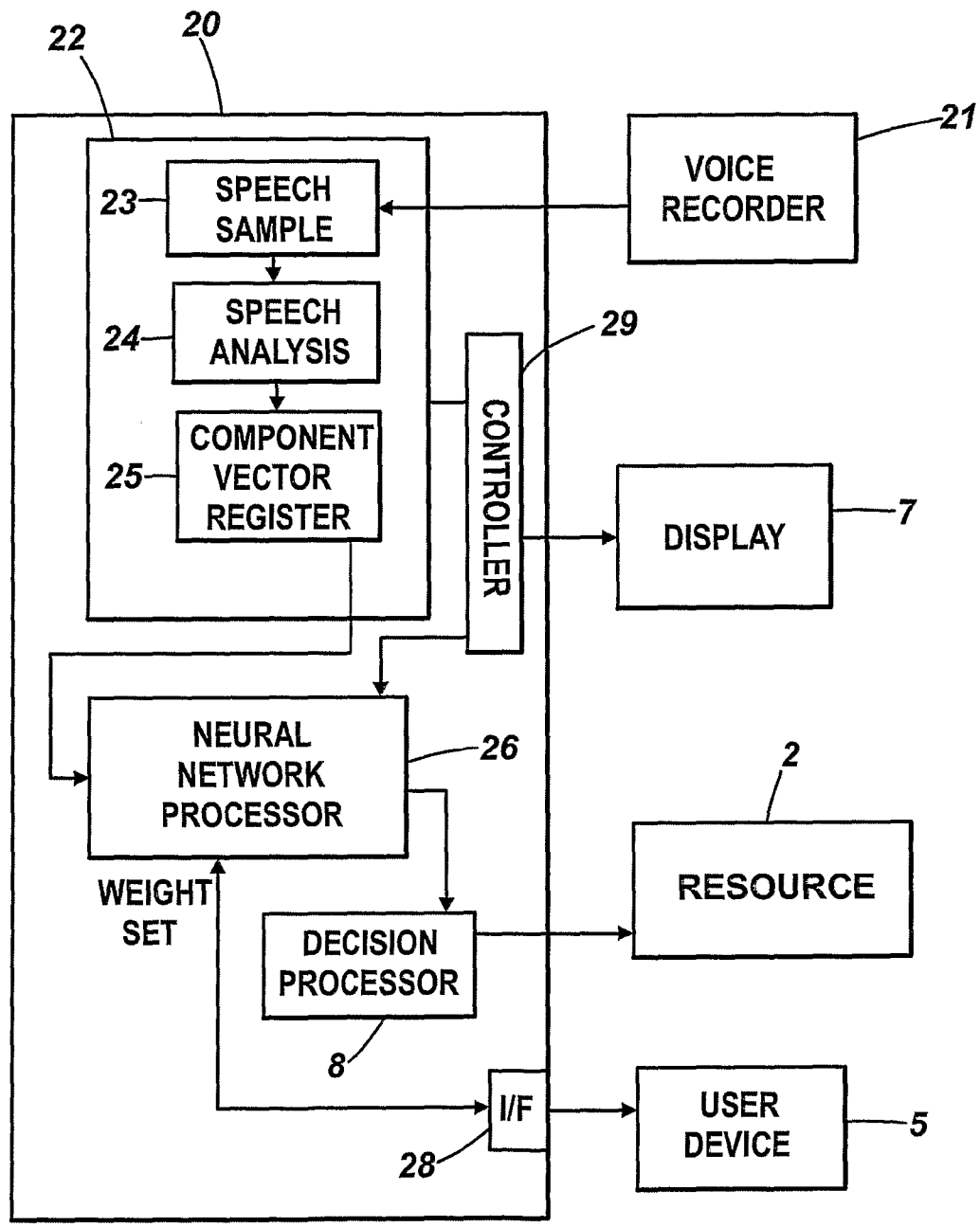
Figure 3:
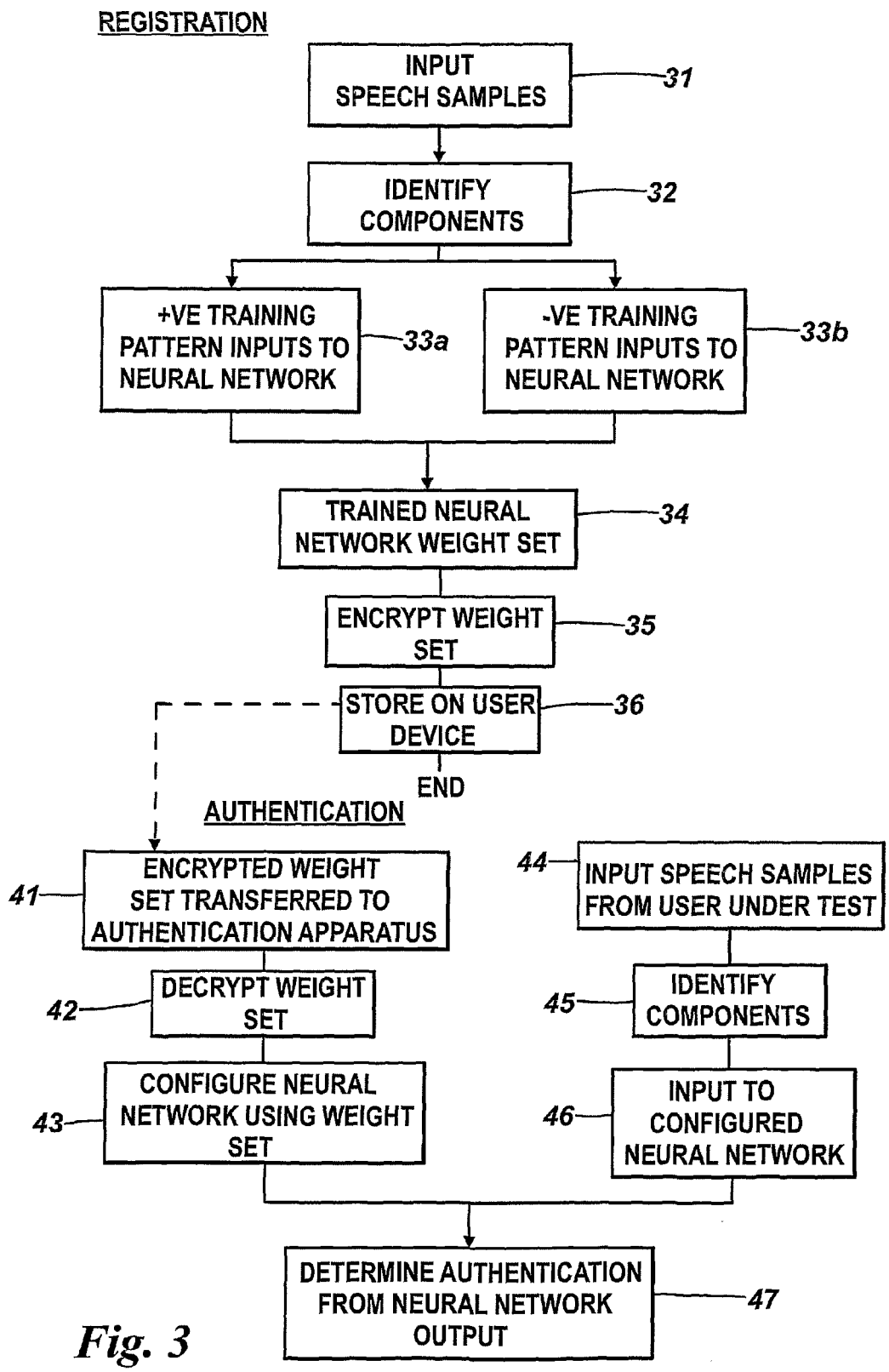

Embodiments of the present invention will now be described by way of example and with reference to the accompanying drawings in which:

FIG. 1 shows a schematic block diagram of apparatus for registering a user's biometric information;

FIG. 2 shows a schematic block diagram of apparatus for using a set of biometric information from a user to authenticate that user and thereby determine whether the user should be granted access to an electronically controlled resource; and FIG. 3 is a flowchart indicating the steps of registering a user's biometric information and subsequently authenticating a user with the registered biometric information.

FIG. 1 shows a schematic functional block diagram of apparatus for registering biometric information of users. In the illustrated example, the biometric information registered is a voice print of the user. However, it will be understood that other biometric information could be registered instead or as well with suitable modifications of the apparatus 10.

The registration apparatus 10 comprises a voice recording device 11 which gathers speech samples from a user. The voice recorder 11 is coupled to a processing module 12 which includes a register 13 for storing recorded speech samples from the voice recorder, an analysis module 14 for analysing the stored speech samples, and a register 15 for storing/forwarding component vectors from the analysed speech.

The registration apparatus 10 also includes a processor 16 configurable as an artificial neural network and a further register 17 for storing/transferring weight sets determined by the neural network 16. Alternatively, other statistical classifiers could be incorporated instead of, or as well as, the artificial neural network with suitable modification of the registration apparatus 10. An interface 18 is provided for communication with a user device 5. The interface 18 may include a wired physical connection such as a USB socket or smart card chip connector. The interface 18 may alternatively or in addition include a wireless connection such as a Bluetooth, RFID, infra-red or WiFi transmitter and receiver. The interface 18 may include any other digital information transfer mechanism, e.g. one using induction or magnetic information transfer such as a magnetic card reader/writer.

The user device 5 may be any suitable portable data storage device. Exemplary devices include smart cards, memory sticks or memory cards, and portable computing devices such as PDAs or mobile telephones.

The registration apparatus 10 also may include a controller 19 for controlling and coordinating the various functional blocks of the registration apparatus 10 and an information display 6 for providing instructions to a user.

An exemplary operation of the registration apparatus will be described later with reference to FIG. 3.

FIG. 2 shows a schematic functional block diagram of a user authentication apparatus 20 for authenticating users based on biometric information. The authentication apparatus is somewhat similar to the registration apparatus 10. In the illustrated example, like for the registration apparatus 10, the biometric information used for authentication is a voice print of the user gathered at a point of access to an electronically controlled resource 2. However, it will be understood that other biometric information could be used instead or as well, with suitable modifications of the apparatus 20.

The authentication apparatus 20 comprises a voice recording device 21 which gathers speech samples from a user. The voice recorder 21 is coupled to a processing module 22 which includes a register 23 for storing recorded speech samples from the voice recorder 21, an analysis module 24 for analysing the stored speech samples, and a register 25 for storing/forwarding component vectors from the analysed speech.

The authentication apparatus 20 also includes a processor 26 configurable as an artificial neural network similar or identical to neural network 16. Alternatively, other statistical classifiers could be incorporated instead of, or as well as, the artificial neural network with suitable modification of the authentication apparatus 20. An interface 28 is provided for communication with a user device 5, as discussed in connection with FIG. 1. The interface 28 may include a wired physical connection such as a USB socket or smart card chip connector. The interface 28 may alternatively or in addition include a wireless connection such as a Bluetooth, RFID, infra-red or WiFi transmitter and receiver. The interface may include any other digital information transfer mechanism, e.g. one using induction or magnetic information transfer such as a magnetic card reader. The authentication apparatus may also include a controller 29 for controlling the various functional blocks of the authentication apparatus and an information display 7 for providing output to a user.

A decision processor 8 is coupled to the neural network 26 to determine whether a user is authenticated or not.

The functionality of the registration apparatus and the authentication apparatus will now be described with reference to FIG. 3.

Registration Process

During registration, a user is requested to record a number of reference speech-input samples (box 31). In one example, the user is requested to repeat three samples using the same registration phrase such as a count of 1 to 9. These samples may be recorded and stored at any suitable quality level required by the circumstances; in a preferred embodiment, 8 kHz, 16-bit PCM way files are captured in register 13 using standard computer system library applications.

Analysis module 14 then converts the three way files into RAW file format from which n×13 component vectors are calculated (box 32) representing the energy and 12 mel frequency cepstral coefficients (MFCC) values of the reference speech sample using a Hamming window of 25 milliseconds. This gives approximately (350 to 450)×13 component input vectors depending on the actual length of the recorded reference speech inputs. Additional components could be included representing the first and second derivates of the energy and mel frequency cepstral coefficients if desired. This would produce a 39 component input vector per sample.

In a preferred embodiment, the analysis module 14 then time-aligns each of the three MFCC component files with transcriptions of the respective registration phrase sample utterances in order to identify the start and end positions of the voiced elements in each sample (e.g. the counts of 1 to 9). These start and end positions are used to select the three times nine sets of 13 component vectors that are to be used (box 33a) as positive training pattern inputs to nine multilayer perceptron neural networks 16 (one neural network for each registration voiced element). Each neural network is then separately trained using conventional back-propagation methods with a momentum training algorithm to produce a target output of 1,0 at the outputs of each of the nine neural network 16. Thus, the neural network may generally comprise multiple neural networks.

The negative training patterns used during neural network training (box 33b) consist of three times nine equivalent sets of 13 component vectors that are derived from speech samples generated from users other than the user being registered. These negative training patterns have a target output of 0,1 from each of the nine neural networks 16. These speech samples generated from other users could form a pre-stored library used by the registration apparatus 10, for example pre-stored in register 13.

The positive and negative training patterns generate a set of weights (box 34) for the neurons in the neural network 16 or each of the nine neural networks as received by register 17. In a general aspect, this set of weights can be considered as a first data set that is derived from a biometric attribute of a reference user. The set of weights may comprise multiple sets of weights, e.g. for each of the multiple neural networks, nine in the example above. The set of weights is then stored (box 36) on the user device 5. In a preferred arrangement, the set of weights is encrypted (box 35) before storing on the user device 5, for example using an RSA encryption algorithm. While RSA encryption is the preferred method, other less powerful encryption algorithms could be used.

In another embodiment, four weight sets corresponding to the four out of nine neural networks that give the best training performance are stored. The use of only the four best performing networks is advantageous in that it reduces the memory requirements for the user device 5 and also reduces the authentication processing time (to be described below) for any given processing capacity of hardware. It will be understood that the selection of four best performing networks out of a total of nine is but one preferred embodiment and other numbers of networks may be used for selection.

Thus, in a general aspect, the registration apparatus 10 exemplifies a means adapted to obtain a reference data sample representative of a biometric attribute of a reference user, e.g. a speech sample or vector components thereof. The reference data sample is used to generate the set of positive training pattern inputs to a reference neural network as exemplified by neural network processor 16. The registration apparatus 10 also exemplifies a means adapted to obtain a differentiating data sample representative of the same biometric attribute of one or more other users, e.g. voice prints of many other users pre-stored in the apparatus. The differentiating data sample is used to generate the set of negative training pattern inputs.

Identity Authentication

During an identity authentication process, the user under test for authentication provides his or her token or device 5 which is physically or wirelessly connected to the authentication apparatus via the interface 28. The encrypted or unencrypted weight set is transferred (box 41) to the authentication apparatus 20. This weight set is decrypted if necessary (box 42) and then used to populate the neural network 26 (box 43). The weight set may comprise multiple weight sets for multiple neural networks, as discussed in connection with the registration process above.

The user under test for authentication is required to speak a prescribed input phrase for authentication purposes (box 44). The prescribed phrase may be the same as that used during registration (e.g. a count of 1 to 9) or may be any other phrase that contains selected voiced elements from the registration phrase (e.g. a four digit number). This prescribed authentication phrase is captured into register 23 as an 8 kHz, 16-bit PCM audio file, in a similar manner to that used during the registration process. Analysis module 24 then calculates (box 45) a corresponding set of n×13 component vectors of this authentication or test speech sample which is time-aligned and segmented into 13 component vector sets corresponding to the number of voiced elements in the authentication phrase. These are presented (box 46) to the respective neural network 26 inputs after they have been configured or trained (box 43) using the weight set from the user device 5. In a preferred arrangement, the four vector sets corresponding to the equivalent four word vector sets stored on the user device are used. In a general aspect, the component vectors can be considered as a second data set representative of the biometric attribute of a test user to be authenticated.

The outputs of the neural network or neural networks then provide an indication of the degree of correlation between the user test input speech sample received from the voice recorder 21 and the previously registered input speech sample received by voice recorder 11 of the registration apparatus 10. In other words, the neural network 26 provides an output from which can be determined a degree of correlation between the biometric attribute of the reference user and the biometric attribute of the test user to be authenticated. In the embodiments described above with multiple neural networks, the neural networks 26 each provide an output and the outputs are averaged to produce a final output that represents the degree of correlation between the biometric attribute of the reference user and the biometric attribute of the test user to be authenticated.

The degree of correlation may be used by decision processor 8 to compare against predetermined threshold levels to make a positive or negative determination about the authenticity of the user under test (box 47).

In a general aspect, the first data set comprises a set of neural network weights adapted to cause the neural network to provide a first target output (e.g. 1,0) when the network is presented with an input representative of the biometric attribute of the reference user and adapted to provide a second target output (e.g. 0,1) different from the first target output when the network is presented with an input representative of the biometric attribute of a user (or preferably an average of many users) other than the reference user.

Successful authentication of a test user as a registered user allows the authentication device to then enable access to the resource 2. If the test is unsuccessful, then the authentication device causes access to the resource 2 to be denied.

The resource 2 may be any suitable electronically controlled resource, including a computer system, a computer process or application executing on a system such as a financial transaction, a physically accessible area such as a building controlled by, for example an electronic lock, to name but a few.

A preferred embodiment has been described in connection with use of voice prints as biometric data identifying an individual. However, it will be recognised that biometric information such as iris scans, fingerprints and any other electronically readable biological attribute can be used to generate a first data set corresponding to a weight set derived from training a neural network, and which biometric information can then be re-read from the individual by an authentication apparatus to use as input to a neural network programmed with the weight set.

A preferred embodiment has been described in which the data processing for the authentication is carried out by a separate apparatus 20 from the user device 5 by transferring the weight set of data (first data set) from the user device 5 to the authentication device 20. It will be recognised that the data processing could be carried out by the user device 5 by providing the neural network 26 on the user device and transferring the test sample data (the second data set) from the authentication apparatus 20 to the user device 5 for processing.

The system described above does not require a central repository of biometric information for authorised or registered individuals. Such a system can reduce the cost of implementation and allow users to retain control of their biometric information. The weight set generated by neural network 16 in register 17 can be deleted as soon as it is transferred to user device 5 and does not need to be retained in the registration apparatus. The way in which the weight set is produced remains a secret of the system provider, and is programmed into the registration apparatus 10 under the control of the system provider. Without knowledge of the process (neural architecture, training set, etc) the decoding of the information on the user device 5 would be impossible or technically unfeasible. Reverse engineering of the process would also be extremely difficult as without the registration user voice print, knowledge of any given weight set would provide little or no indication of the weight set production process. Thus a lost user device is useless to a third party unless they can also provide a real time voice print or other biometric information at the point of access/authentication. Similarly, cloning of a user device is also worthless for the same reason.

Until the point of presentation of a user device or token at an access point, each access point only has an empty neural network. The network is only configured at the time of use by the weight set from the user device and nothing needs to be retrieved from a database of registered users. As discussed in specific examples above, the neural network may comprise multiple neural networks and the weight set may comprise multiple weights sets each corresponding to a one of the neural networks.

Also as discussed above, a neural network can be replaced with any other suitable form of statistical classifier, for example a Support Vector Machine (SVM) among others.

Other embodiments are intentionally within the scope of the accompanying claims.

The invention claimed is:
1. A method of biometric authentication of a test user, comprising the steps of:

encrypting and storing, in a first device, a first data set derived from a biometric attribute of a reference user, wherein the biometric attribute is a voice print of a user and the first data set comprises multiple weight sets, each weight set corresponding to a respective neural network, each weight set and each neural network corresponding to a different voiced element;

providing, in a second device separable from the first device, a plurality of untrained artificial neural networks prior to a time of authentication;

obtaining at the time of authentication of the test user, by the second device, a second data set representative of the biometric attribute of the test user, wherein the second data set comprises components of speech input from the test user, the speech input comprising a plurality of voiced elements;

transferring, over a wired or wireless data connection, the first data set from the first device to the second device at the time of authentication;

decrypting and using the first data set as weights for the untrained neural networks in the second device to generate trained neural networks at the time of authentication;

providing the second data set as inputs to the trained neural networks using input corresponding to each voiced element as an input to a respective one of said trained neural networks; and determining, from an average of the trained neural networks outputs corresponding to said inputs, a degree of correlation between the biometric attribute of the reference user and the biometric attribute of the test user.

2. The method of claim 1 in which the first data set comprises sets of neural network weights each adapted to cause a respective one of the neural networks to provide a first target output when the respective network is presented with an input representative of the biometric attribute of the reference user and adapted to provide a second target output different from the first target output when the network is presented with an input representative of the biometric attribute of a user other than the reference user.

3. The method of claim 1 in which the step of obtaining the second data set comprises:
   obtaining a speech input from the test user;
   determining a number of component vectors of said speech input;
   using said component vectors as said second data set.

4. The method of claim 1 in which the step of determining a degree of correlation comprises authenticating said test user as the reference user if the average of the trained neural networks outputs reaches a predetermined threshold level.

5. The method of claim 1 in which the step of determining a degree of correlation comprises authenticating said test user as the reference user if each trained neural network output reaches a predetermined threshold level.

6. The method of claim 1 in which each trained neural network is provided in the second device.

7. The method of claim 1 further including the steps of registering the reference user by the steps of:
   obtaining a reference data sample representative of said biometric attribute of said reference user;
   obtaining a differentiating data sample representative of said biometric attribute of one or more persons different from said reference user;
   using said reference data sample to generate a set of positive training pattern inputs to reference neural networks to achieve a first target output;
   using said differentiating data sample to generate a set of negative training pattern inputs to the reference neural networks to achieve a second target output; and
   determining said first data set as the set of weights from the reference neural networks that achieve the first and second target outputs.

8. The method of claim 1 further including the steps of:
   providing the first device as a user portable device; and
   providing the second device as a device coupled to an electronically controlled resource to which the user may be granted or refused access on the basis of the step of determining said degree of correlation.

9. Apparatus for providing biometric authentication of a test user at a time of authentication, comprising:
   first input means configured to receive, at the time of authentication, an encrypted first data set from a first device that is separable from the apparatus, the first data set derived from a biometric attribute of a reference user, wherein the biometric attribute is a voice print of a user and the first data set comprises multiple weight sets, each weight set corresponding to a respective neural network, each weight set and each neural network corresponding to a different voiced element;
   second input means configured to receive, at the time of authentication, a second data set representative of a biometric attribute of the test user, wherein the second data set comprises components of speech input from the test user, the speech input comprising a plurality of voiced elements;
   means for decrypting the first data set received over a wired or wireless data connection at the time of authentication, from the first input means;
   a processor configured as a plurality of untrained artificial neural networks adapted to receive the first data set from the decrypting means and program the untrained neural networks with said first data set as weights in the neural networks to generate trained neural networks, the processor being configured as the untrained neural networks prior to receiving the first data set;
   the processor being further adapted to receive the second data set as input to the trained neural networks from the second input means, wherein the processor is configured to use said input corresponding to each voiced element as an input to a respective one of said trained neural networks; and
   means for determining, from an average of the trained neural network outputs corresponding to said input, a degree of correlation between the biometric attribute of the reference user and the biometric attribute of the test user.

10. The apparatus of claim 9 in which the first data set comprises sets of neural network weights each adapted to cause a respective one of the neural networks to provide a first target output when the respective network is presented with an input representative of the biometric attribute of the reference user and adapted to provide a second target output different from the first target output when the network is presented with an input representative of the biometric attribute of a user other than the reference user.

11. The apparatus of claim 9 in which the second input means further includes:
   means for obtaining a speech input from the test user;
   means for determining a number of component vectors of said speech input;
   means for providing said component vectors as said second data set.

12. The apparatus of claim 9 in which the means for determining a degree of correlation is adapted to authenticate said test user as the reference user if the average of the trained neural networks outputs reaches a predetermined threshold level.

13. The apparatus of claim 9 in which the means for determining a degree of correlation is adapted to authenticate said test user as the reference user if each trained neural network output reaches a predetermined threshold level.

14. The apparatus of claim 9 in which the first input means is adapted to receive said first data set from the first device connectable to said apparatus and said second input means is adapted to receive said second data set from a user input device.

15. The apparatus of claim 14 in which:
the first device is a user portable device; and
the user input device comprises means for reading a biometric attribute of the human body.

16. The apparatus of claim 15 in which the user input device comprises a voice recorder.
means adapted to obtain a reference data sample representative of said biometric attribute of said reference user;
means adapted to obtain a differentiating data sample representative of said biometric attribute of one or more persons different from said reference user;
means adapted to use said reference data sample to generate a set of positive training pattern inputs to a reference neural network to achieve a first target output;
means adapted to use said differentiating data sample to generate a set of negative training pattern inputs to the reference neural network to achieve a second target output; and
means adapted to determine said first data set as the set of weights from the reference neural network that achieve the first and second target outputs.

17. The apparatus of claim 15 further including:
an electronically controlled resource coupled to the means for determining said degree of correlation, the apparatus configured such that the user may be granted or refused access to the electronically controlled resource based on said degree of correlation.

18. The apparatus of claim 9 further including registration means for registering the reference user, comprising:
means adapted to obtain a reference data sample representative of said biometric attribute of said reference user;
means adapted to obtain a differentiating data sample representative of said biometric attribute of one or more persons different from said reference user;
means adapted to use said reference data sample to generate a set of positive training pattern inputs to a reference neural network to achieve a first target output;
means adapted to use said differentiating data sample to generate a set of negative training pattern inputs to the reference neural network to achieve a second target output; and
means adapted to determine said first data set as the set of weights from the reference neural network that achieve the first and second target outputs.

19. Apparatus for providing biometric authentication of a test user at a time of authentication, comprising:
first input configured to receive, at the time of authentication, an encrypted first data set from a first device that is separable from the apparatus, the first data set derived from a biometric attribute of a reference user, wherein the biometric attribute is a voice print of a user and the first data set comprises multiple weight sets, each weight set corresponding to a respective neural network, each weight set and each neural network corresponding to a different voiced element;
second input configured to receive, at the time of authentication, a second data set representative of the biometric attribute of the test user, wherein the second data set comprises components of speech input from the test user, the speech input comprising a plurality of voiced elements;
a processor configured as a plurality of untrained artificial neural networks, the processor adapted to receive and decrypt the first data set from the first input, over a wired or wireless data connection at the time of authentication, the processor configured as the untrained artificial neural networks prior to receiving the first data set, and program the untrained artificial neural networks with said first data set as weights in the neural networks to generate trained neural networks;
the processor being further adapted to receive the second data set as input to the trained neural networks from the second input, wherein the processor is configured to use said input corresponding to each voiced element as an input to a respective one of said trained neural networks; and
wherein the processor is configured to determine, from an average of the trained neural network outputs corresponding to said input, a degree of correlation between the biometric attribute of the reference user and the biometric attribute of the test user.

* * * * *